United States Patent [19]

Miskelly, Jr. et al.

[11] Patent Number: 5,579,635

[45] Date of Patent: Dec. 3, 1996

[54] DISTRIBUTED EROSION REGION ROCKET MOTOR NOZZLE

[75] Inventors: Hermann L. Miskelly, Jr.; Mark C. Horton; Sheryl H. Hepler, all of Huntsville, Ala.

[73] Assignee: Thiokol Corporation, Ogden, Utah

[21] Appl. No.: 342,146

[22] Filed: Nov. 18, 1994

[51] Int. Cl.$^6$ ........................................... F02K 1/18
[52] U.S. Cl. ............................ 60/242; 60/235; 60/253; 60/271; 102/374
[58] Field of Search ............................ 60/234, 235, 242, 60/251, 271, 253; 102/374, 381

[56] References Cited

U.S. PATENT DOCUMENTS

| | | | |
|---|---|---|---|
| 3,049,877 | 8/1962 | Sherman | 60/35.55 |
| 3,191,379 | 6/1965 | Pierce | 60/271 |
| 3,401,887 | 9/1968 | Sheppard | 239/265.35 |
| 3,537,646 | 11/1970 | Emerson | 239/265.15 |
| 3,613,374 | 10/1971 | Ritchey | 60/219 |
| 3,633,631 | 1/1972 | Hatch | 60/271 |
| 3,659,789 | 5/1972 | Schultz | 239/265.19 |
| 3,729,935 | 5/1973 | Fletcher et al. | 60/256 |
| 3,974,772 | 8/1976 | Pelham et al. | 102/70.2 A |
| 3,989,191 | 11/1976 | McCullough | 239/265.15 |
| 4,108,381 | 8/1978 | Sottosanti et al. | 239/265.35 |
| 4,157,788 | 6/1979 | Canfield et al. | 239/265.35 |
| 4,168,031 | 9/1979 | McCullough et al. | 239/265.19 |
| 4,272,956 | 6/1981 | Lamere et al. | 60/242 |
| 4,327,885 | 5/1982 | Blevins et al. | 244/3.24 |
| 4,383,407 | 5/1983 | Inman | 60/271 |
| 4,478,040 | 10/1984 | Johnson | 60/225 |
| 4,574,700 | 3/1986 | Lewis | 102/374 |
| 4,579,299 | 4/1986 | Lavery et al. | 244/3.22 |
| 4,649,701 | 3/1987 | Wendel | 60/232 |
| 4,681,261 | 7/1987 | Wetzler et al. | 239/265.19 |
| 4,750,326 | 6/1988 | Kruse et al. | 60/253 |
| 4,759,215 | 7/1988 | Atchley et al. | 73/167 |
| 4,819,426 | 4/1989 | Singer et al. | 60/250 |
| 4,821,510 | 4/1989 | Graser et al. | 60/242 |
| 4,864,817 | 9/1989 | Fling et al. | 60/250 |
| 4,867,393 | 9/1989 | Faupell et al. | 244/3.22 |
| 4,938,824 | 7/1990 | Youngkeit | 156/173 |
| 5,070,691 | 12/1991 | Smith et al. | 60/245 |
| 5,113,650 | 5/1992 | Junior et al. | 60/253 |
| 5,206,989 | 5/1993 | Smith et al. | 29/890.01 |
| 5,220,783 | 6/1993 | Cherry et al. | 60/204 |
| 5,228,285 | 7/1993 | Van Name et al. | 60/253 |
| 5,280,706 | 1/1994 | Yorgason | 60/255 |
| 5,298,313 | 3/1994 | Noland | 428/229 |
| 5,359,850 | 9/1994 | Prescott | 60/271 |

*Primary Examiner*—Charles G. Freay
*Attorney, Agent, or Firm*—Madson & Metcalf; Ronald L. Lyons

[57] ABSTRACT

A rocket motor nozzle has a nozzle core that defines a nozzle passage through which combustion products travel during flight. The erosive forces created by the combustion products are longitudinally distributed over the nozzle core so that the nozzle's smallest area remains substantially constant in spite of the erosion. An inner surface of the nozzle core defines the nozzle passage. The inner surface includes an entry region which defines a nozzle entry, an exit region which defines an exit, and an elongate erosion region which defines an erosion passage between the entry and exit. The erosion region length is greater than the average smallest passage diameter, thereby allowing the location of the erosion focus along the erosion region to vary over time as a result of erosion of the erosion region. The nozzle core is formed of a fibrous composite material which is selected according to the type of propellant used and which includes fibers oriented transverse to the erosion passage to resist erosion.

32 Claims, 2 Drawing Sheets

5,579,635

DISTRIBUTED EROSION REGION ROCKET MOTOR NOZZLE

FIELD OF THE INVENTION

The present invention relates to a rocket motor nozzle in which erosion from combustion products is distributed, and more particularly to a low-cost nozzle having an erosion region whose length is several times its smallest diameter.

TECHNICAL BACKGROUND OF THE INVENTION

A rocket motor nozzle includes a quantity of nozzle material arranged around a nozzle passage. In flight, a rocket motor adjacent to the nozzle creates combustion products which are forced under pressure through the nozzle passage out to the rocket's ambient environment. As the combustion products pass through the nozzle passage, they exert erosive forces on the nozzle material. Conventional nozzles attempt to substantially eliminate erosion of the nozzle material by the combustion products.

Control over nozzle erosion is sought because erosion may affect the thrust created by the rocket motor and nozzle. Erosion control is most important at the "throat," which is the portion of the nozzle passage having the smallest cross-sectional area. In a conventional nozzle, the location of the throat along the longitudinal axis of the rocket does not change substantially during flight. However, the size of the throat may increase as erosion wears away part of the nozzle passage.

In general, increasing the size of the throat tends to decrease the pressure within the combustion chamber, and hence decreases the impetus on combustion products to exit the chamber. This decrease in turn reduces the rocket's thrust, because thrust =mass change×velocity. That is, the thrust created equals the product formed by multiplying the total mass of the combustion products exiting the rocket per unit of time by the velocity of the exiting products. In short, increased erosion tends to increase the diameter of the nozzle's throat and hence tends to decrease the thrust produced.

The erosive forces act directly on the throat because the combustion products usually reach critical velocity (Mach one) within the throat. However, the extent to which combustion products erode the nozzle material depends on several factors. Some of the principal factors affecting nozzle erosion are the pressure within the nozzle passage, the temperature of the combustion products, the chemical composition of the nozzle material, the chemical composition of the combustion products, and the duration of the "burn" which produces the combustion products.

To maintain a substantially constant nozzle throat diameter, many conventional nozzles utilize nozzle materials chosen for their ability to resist erosion. For instance, some nozzles include an erosion-resistant liner which surrounds at least a portion of the nozzle passage. The nozzle passage liner is typically formed of "non-eroding" materials such as carbon—carbon, tungsten, or molybdenum. One such conventional nozzle is used in tactical rockets, including tactical non-line-of-sight ("NLOS") rockets which have sustained burn times in excess of 100 seconds.

The conventional NLOS nozzle includes a metallic structural shell disposed around concentric layers of nozzle material. The outer layer of nozzle material includes an insulator, such as an alumina-silica ceramic. The inner layer of nozzle material includes a substantially non-eroding nozzle passage liner, such as a molybdenum liner. The nozzle is attachable to a rocket motor.

The nozzle includes an entry, a nozzle passage, and an exit orifice. During flight, combustion products from a rocket motor's combustion chamber enter the entry, pass through the passage, and exit through the orifice into the ambient environment. As noted, the throat is defined as the smallest part of the passage. Erosion of the liner about the throat is limited by the erosion-resistant nature of the material used in forming the liner.

Although nozzle passage liners formed of carbon-carbon, tungsten, molybdenum, or similar materials minimize erosion, they are also relatively expensive. For example, in a typical NLOS rocket, a molybdenum liner may account for one-fourth or more of the total cost of the rocket motor. Moreover, few such rocket motors are typically recovered, so the high cost of such non-eroding liners cannot be spread over many uses of the nozzle.

Thus, it would be an advancement in the art to provide a rocket motor nozzle which allows a rocket motor to control nozzle passage erosion without requiring the use of an expensive nozzle passage liner.

It would also be an advancement in the art to provide such a nozzle which is suitable for use in tactical rockets, including tactical NLOS rockets which have sustained burn times in excess of 100 seconds.

Such a rocket motor nozzle is disclosed and claimed herein.

BRIEF SUMMARY OF THE INVENTION

The present invention provides a low-cost rocket motor nozzle that is suitable for use with long duration, low thrust rocket motors. As described in detail below, the nozzle has a nozzle core that defines a nozzle passage through which combustion products travel during flight before exiting the rocket. Unlike conventional nozzles, the present invention distributes the erosive forces created by the combustion products over different portions of the nozzle as time passes. Erosion is allowed, but is longitudinally distributed over the nozzle core so that the nozzle's smallest cross-sectional area remains substantially constant in spite of the erosion.

In a preferred embodiment, the nozzle of the present invention is configured for attachment to a rocket motor. The rocket motor includes a rocket motor housing which surrounds a combustion chamber that is capable of receiving combustion products from a propellant. The propellant may be a minimum smoke propellant, a reduced smoke propellant, or an aluminized propellant. Those of skill in the art will appreciate that the present nozzle may be employed in connection with solid fuel, liquid fuel, or hybrid rocket motors.

The nozzle includes a substantially cylindrical hollow nozzle housing. The forward end of the housing is configured for attachment to the rocket motor housing by bolts or other conventional attachment means. The housing is formed of aluminum or other conventional aerospace structural housing materials.

The nozzle also includes a nozzle core having an outer surface and an inner surface. The outer surface of the nozzle core is positioned adjacent the nozzle housing, and is secured to the nozzle housing by an adhesive and/or by metallic pins in a manner familiar to those of skill in the art.

The inner surface of the nozzle core defines a nozzle passage through which combustion products pass during flight. The inner surface includes an entry region which defines a nozzle entry. As the rocket motor burns during flight, the nozzle entry receives combustion products from the rocket motor combustion chamber. The inner surface of the nozzle core also includes an exit region which defines an exit. Combustion products are released from the exit into the ambient environment during flight.

The erosion region of the nozzle core defines an erosion passage that extends generally along a longitudinal axis. As the rocket motor burns during flight, the erosion passage places the entry in fluid communication with the exit. The erosion region is not necessarily symmetric about the longitudinal axis, but in a presently preferred embodiment the erosion region is tubular with a substantially circular cross-section. The erosion region extends generally along the longitudinal axis between the entry and exit regions for a distance which is denoted the "erosion region length."

Each cross-section of the erosion region taken transverse to the longitudinal axis defines an erosion passage section. Each such section has a section area, which is the transverse cross-sectional area of the erosion passage at the location of the section in question. Each erosion passage section also has a section diameter, which is the length of the longest straight line segment within the section.

A portion of the erosion region which has a section area no greater than the area of any other erosion region section may define an erosion focus. The erosion focus is located at the minimal-area section at which the combustion products passing through the nozzle passage reach critical velocity. Like a conventional throat, the erosion focus thus occurs at the smallest part of the nozzle passage. Unlike a conventional throat, however, the location of the erosion focus may vary substantially along the longitudinal axis of the nozzle during flight.

The erosion focus has an average focus area that is defined as the average area over time of the sections that contain the erosion focus. The erosion focus also has an average focus diameter that is defined as the average diameter over time of the sections that contain the erosion focus. The erosion region length is greater than the average focus diameter, thereby allowing the location of the erosion focus along the longitudinal axis to vary over time as a result of erosion.

In some embodiments, the erosion region length is at least five times the average focus diameter. The erosion region length is preferably at least seven times the average focus diameter, and is most preferably at least ten times the average focus diameter. Regardless of the particular ratio utilized, however, the nozzle passage geometry of the present invention contrasts sharply with conventional nozzles in which erosion remains focused on a fixed throat.

The elongate erosion region serves to distribute the effects of erosion during flight. The erosive forces caused by combustion products passing through the nozzle tend to focus on different portions of the erosion region over time because the nozzle is configured to allow longitudinal movement of the erosion focus. Typically, as the erosion region about the section which presently contains the erosion focus erodes, that section's area at some time ceases being minimal and instead exceeds the area of a section at a different location along the longitudinal axis of the erosion passage. As a result, the erosion focus moves to the smaller section. The smaller section erodes in turn until it exceeds the area of yet another section. In this manner, the erosion is longitudinally distributed along the erosion region, so that the area of the erosion focus remains substantially constant over time in spite of the erosion. The thrust produced using the nozzle therefore does not substantially decrease as a result of the erosion.

It is presently preferred that such erosion distribution be employed in combination with means which reduce erosion of the erosion region. It is understood, however, that such means do not include expensive non-eroding erosion focus liners such as the molybdenum liner used in conventional nozzles. Rather, the nozzle core of the present invention is preferably formed of a fibrous composite material which is selected according to the type of propellant used and which includes fibers oriented to resist erosion.

Thus, if the propellant is a minimum smoke solid propellant, the core is preferably formed of silica-phenolic, glass-phenolic or, most preferably, of cellulose-phenolic. If the propellant is a reduced smoke solid propellant, the core is preferably formed of silica-phenolic or, most preferably, of glass-phenolic. If the propellant is an aluminized solid propellant, the core is formed, in order of increasing preference, from silicon carbide ceramic, carbon-carbon, monolithic graphite, graphite-phenolic, or most preferably, from carbon-phenolic. Proper combinations of propellant types and nozzle core materials minimize the erosion caused by the combustion products of the propellant.

To further reduce erosion, a substantial proportion of the fibers in the fibrous composite material are preferably oriented transverse to the longitudinal axis of the erosion passage. The fibers are most preferably oriented perpendicular to the longitudinal axis of the erosion passage. Tools and methods for orienting the fibers in this manner during nozzle formation are well known to those of skill in the art.

In summary, the present invention provides a nozzle which both resists erosion and reduces the effects of the erosion that does occur. Erosion resistance is provided, not by expensive liners, but rather by orienting the fibers of the erosion region transverse to the flow of combustion products and by selecting erosion region materials according to the type of propellant used. The adverse impact of erosion is minimized by providing an elongate erosion region which allows erosion to be distributed rather than remaining focused on a short length of the nozzle passage. Thus configured, the present nozzle is suitable for use in tactical rockets and other applications in which long-burn-duration, low-cost rocket motors are preferred.

These and other features and advantages of the present invention will become more fully apparent through the following description and appended claims taken in conjunction with the accompanying drawings.

BRIEF DESCRIPTION OF THE DRAWINGS

In order to illustrate the manner in which the above-recited and other advantages and features of the invention are obtained, a more particular description of the invention summarized above will be rendered by reference to the appended drawings. Understanding that these drawings only provide a selected embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the figures wherein like parts are referred to by like numerals. The present invention relates to a low-cost rocket motor nozzle that is suitable for use with long duration, low thrust rocket motors. Unlike conventional nozzles, the present invention distributes erosive forces from combustion products over different portions of the nozzle during flight. Distributing the effects of erosion permits the nozzle to maintain a substantially constant minimal nozzle passage area in spite of the erosion, and to do so without the use of expensive conventional "non-eroding" liners.

Figure 1:
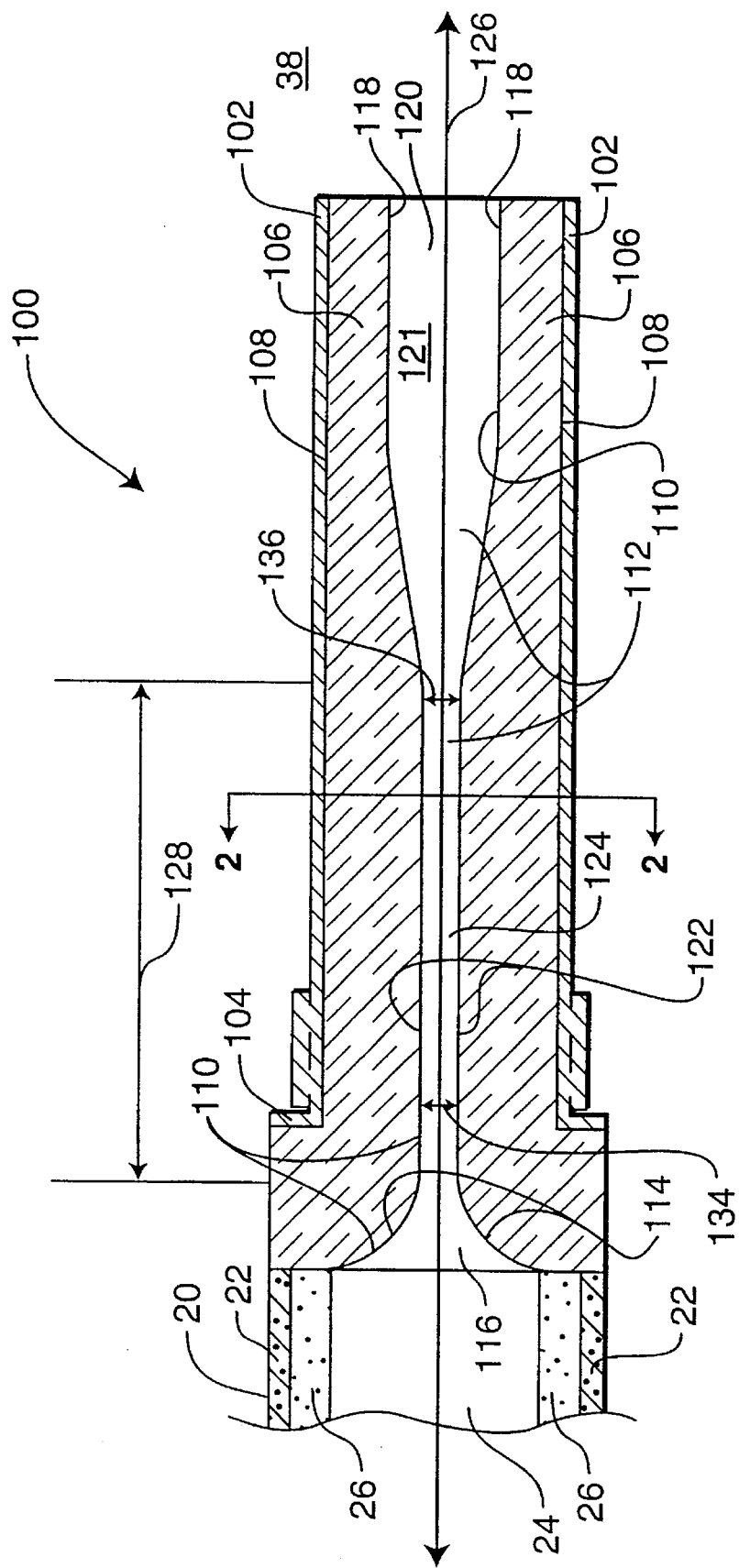
FIG. 1 is a longitudinal cross-sectional view of a rocket motor nozzle according to the present invention.

One embodiment of the nozzle, indicated generally at 100 in FIG. 1, is configured for attachment to a rocket motor 20. The rocket motor 20 includes a conventional rocket motor housing 22. The rocket motor housing 22 substantially surrounds a combustion chamber 24 that is capable of receiving combustion products from a conventional propellant 26.

The propellant 26 may be a minimum smoke propellant such as the propellants used in the HELLFIRE and TOW rocket motors. The propellant 26 may also be a reduced smoke propellant, i.e., one that is substantially free of aluminum, such as the propellants used in Sidewinder and NLOS rocket motors. Alternatively, the propellant 26 may be an aluminized propellant such as the propellants used in the Standard Missile and Patriot rocket motors. The particular propellants mentioned herein are illustrative only, and in no way limit the scope of the present invention. Indeed, the present nozzle may be employed in connection with liquid fuel rocket motors or hybrid rocket motors as well as solid fuel motors.

The nozzle 100 includes a substantially cylindrical hollow nozzle housing 102. The forward end 104 of the housing is configured for attachment to the rocket motor housing 22 by bolts (not shown) or other conventional attachment means. The nozzle housing 102 is formed of aluminum or other conventional aerospace structural housing materials.

The nozzle 100 also includes a nozzle core 106. The core 106 has an outer surface 108 and an inner surface 110. The outer surface 108 is positioned adjacent the nozzle housing 102 and is secured to the housing 102 by an adhesive and/or by metallic pins in a manner familiar to those of skill in the art. The materials used in forming the core 106 are discussed below.

The inner surface 110 of the nozzle core 106 defines a nozzle passage 112. The inner surface 110 includes an entry region 114 which defines a nozzle entry 116. As used herein, the term "region" refers to a region of a surface unless otherwise indicated. The extent, shape, and dimensions of the entry region 114 are readily determined by those of skill in the art according to the particular rocket motor 20 used and the intended application of the nozzle 100 in accordance with the teachings herein. Thus, the entry region 114 may be generally circular, cylindrical, frusto-conical, or may take another shape.

The inner surface 110 of the nozzle core 106 also includes an exit region 118 which defines an exit 120. The exit region 118 may be circular, cylindrical, frusto-conical, or another shape. The exit region 118 may be substantially limited to the perimeter of the exit 120, or the exit region 118 may extend forward toward the entry region 114. The exit 120 may include a chamber 121 within the core 106 as illustrated, or the exit 120 may be limited to an orifice. The appropriate extent, shape, and dimensions of the exit region 118 may be readily determined by those of skill in the art according to the teachings herein and the intended use of the nozzle 100.

An erosion region 122 of the nozzle core 106 defines an erosion passage 124. As explained further below, the erosion region 122 includes the portion of the inner surface 110 which may potentially define the erosion focus of the nozzle passage 112 during flight. Thus, the cross-sectional area of the erosion passage 124 is substantially constant.

In embodiments employing a tubular erosion passage 124, the diameters of different circular transverse cross-sections of the erosion passage 124 differ from one another by no more than about five percent, and preferably differ from one another by no more than about two percent, for substantially all pairs of such cross-sections. In other embodiments, the transverse cross-sectional areas of the passage 124 likewise differ from one another at most by a small percentage, such as about five percent, and preferably by at most about two percent, for substantially all pairs of transverse cross-sections. In all embodiments, smaller differences are generally preferred in order to facilitate distribution of the effects of erosion.

The erosion region 122 and the erosion passage 124 extend generally along a longitudinal axis 126. The erosion region 122 extends generally along the longitudinal axis 126 between the entry region 114 and the exit region 118 for a distance 128 which is denoted the "erosion region length."

Figure 2:
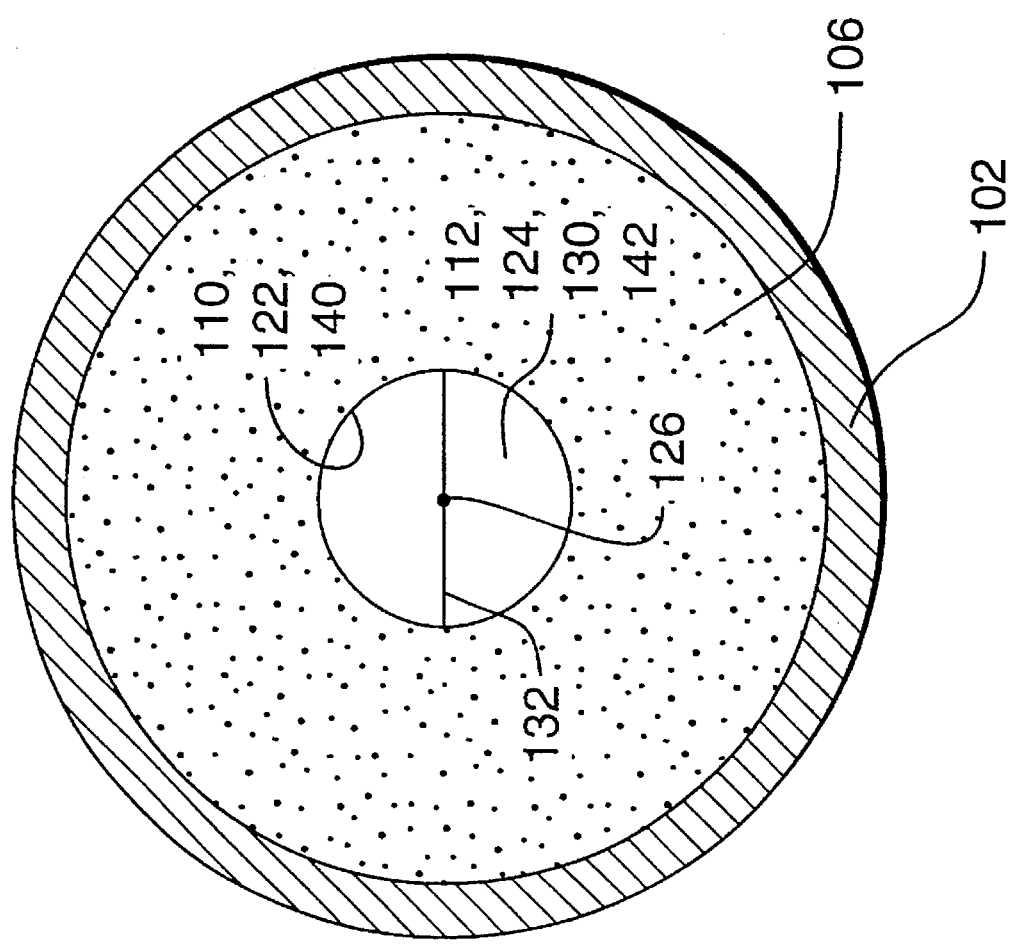
FIG. 2 is a transverse cross-sectional view taken along line 2—2 of FIG. 1.

With reference to FIGS. 1 and 2, each cross-section of the erosion region 122 taken transverse to the longitudinal axis 126 defines an erosion passage "section" such as the section 130 shown in FIG. 2. Each section 130 is thus located within the nozzle passage 112 between the entry 116 and the exit 120. Each section has a section area, which is the transverse cross-sectional area of the erosion passage 124 at the location of the section in question.

Each erosion passage section such as the section 130 also has a section diameter, which is the length of the longest straight line segment within the section. The diameter of the section 130 is indicated at 132 in FIG. 2. Although sections may be shaped like circular disks as shown in FIG. 2, they may also take other shapes. Use of the term "diameter" for sections is not intended to restrict sections to circular shapes. For instance, the diameter of a square-shaped section is the length between opposite corners of the square.

In a presently preferred embodiment, the erosion region 122 is tubular. That is, the erosion region 122 preferably has a substantially circular cross-section, such as the cross-section shown in FIG. 2, along the entire length of the erosion region 122. However, the erosion region 122 need not be a body of revolution about the longitudinal axis 126. Those of skill in the art will recognize that sections which are oval, elliptical, rectangular, star-shaped, otherwise polygonal, or a variety of other shapes may also be employed in nozzles according to the present invention.

Moreover, although a tubular erosion region 122 is presently preferred, the present invention does not require that the shape of sections be constant for the length of the erosion region 122. Thus, an alternative embodiment of an erosion region might have circular sections which gradually deform into elliptical sections as one moves along the longitudinal axis 126.

Any portion of the erosion region 122 which has a section area that is no greater than the area of any other section of the erosion region 122 may define an erosion focus region 140. One such erosion focus region 140 is shown in FIG. 2. The erosion focus region 140 defines an erosion focus 142.

The location of the erosion focus 142 along the longitudinal axis 126 may change over time. The erosion focus 142 is always located at a minimal-area section of the erosion passage 124. At any given time during flight, several sections at different positions along the longitudinal axis 126 may have the same minimal section area, but only one section at a time defines the erosion focus 142. The erosion focus 142 is located at the minimal-area section at which the combustion products passing through the nozzle passage 112 reach critical velocity.

The erosion focus 142 has an average focus diameter that is defined as the average over time of the section diameters 132 of the erosion focus 142, and an average focus area that is defined as the average over time of the areas of the sections 140 defining the erosion focus 142. As suggested by FIG. 1, the erosion region length 128 is greater than the average erosion focus diameter, and is preferably substantially greater (however, FIG. 1 is not necessarily to scale). In some embodiments, the erosion region length 128 is at least five times the average focus diameter. The erosion region length 128 is preferably at least seven times the average focus diameter, and is most preferably at least ten times the average focus diameter.

Regardless of the particular ratio utilized, however, the nozzle passage geometry of the present invention contrasts sharply with conventional nozzles. In conventional nozzles the erosion focus location remains substantially fixed within a short and severely narrowed portion of the nozzle passage. For instance, the elongate erosion region 122 gives the present nozzle 100 a geometry that differs sharply from the conventional nozzle and throat geometry.

With reference to FIG. 1, it is presently preferred that the nozzle core 106 be formed of a fibrous composite material which is selected according to the type of propellant 26 used in the rocket motor 20. Thus, if the propellant 26 is a minimum smoke solid propellant, the core 106 is preferably formed of silica-phenolic, glass-phenolic or, most preferably, of cellulose-phenolic. If the propellant 26 is a reduced smoke solid propellant, the core 106 is preferably formed of silica-phenolic or, most preferably, of glass-phenolic. If the propellant 26 is an aluminized solid propellant, the core 106 is formed, in order of increasing preference, from silicon carbide ceramic, carbon-carbon, monolithic graphite, graphite-phenolic, or most preferably, from carbon-phenolic. Proper combinations of propellant types and nozzle core materials reduce the erosion of the core 106 caused by the combustion products of the propellant 26.

It is also presently preferred that the nozzle core 106 be configured with the fibers of the fibrous composite material oriented to resist erosion. A substantial proportion of the fibers in the fibrous composite material are preferably oriented transverse to the longitudinal axis 126 of the erosion passage 124. The fibers are most preferably oriented perpendicular to the longitudinal axis 126 of the erosion passage 124. Tools and methods for orienting the fibers in this manner during nozzle formation are well known to those of skill in the art.

In operation, the nozzle passage 112 places the combustion chamber 24 in fluid communication with the ambient environment 38. Combustion products leaving the combustion chamber 24 under pressure pass through the entry 116 into the erosion passage 124, through the erosion focus 142, and out the exit 120. During their passage, the combustion products exert erosive forces on the inner surface 110 of the nozzle core 106. As noted above, some control must be exerted over the effects of these erosive forces if adequate performance is to be obtained from the rocket motor 20.

Accordingly, the elongate erosion region 122 serves to distribute the effects of erosion during flight. The erosive forces caused by the combustion products tend to focus on different portions of the erosion region 122 over time because those forces act most strongly on the erosion focus 142, and the location of the erosion focus 142 changes in response to those forces. As the erosion region 122 erodes about the section 130 which presently defines the erosion focus 142, the area of that section 130 at some time ceases being minimal and instead exceeds the area of another section 134 which is located at a different position along the longitudinal axis 126. As a result, the erosion focus 142 moves to the position of the smaller section 134.

The smaller section 134 erodes in turn until it exceeds the area of yet another section 136. The positions of the sections 130, 134, and 136 shown in FIG. 1 are illustrative only, as the actual locations within the erosion passage 124 assumed by the erosion focus 142 will typically vary from one particular nozzle 100 to the next. However, in each nozzle 100 the erosion will be longitudinally distributed along the erosion region 122 so that the area of the erosion focus 132 (FIG. 2) remains substantially constant over time in spite of the erosion. The thrust produced using the nozzle 100 therefore does not substantially decrease as a result of the erosion. Although such distribution of erosion may marginally reduce performance, the nozzle of the present invention can be produced at substantially lower cost than conventional nozzles because it does not require an expensive liner.

In summary, the present invention provides a nozzle which both resists erosion and reduces the effects of the erosion that does occur. Erosion resistance is provided by orienting the fibers of the erosion region transverse to the flow of combustion products and by selecting erosion region materials according to the type of propellant used. The adverse impact of erosion is minimized by providing an elongate erosion region which allows erosion to be longitudinally distributed rather than remaining focused on a short portion of the nozzle passage. Unlike conventional nozzles, no expensive "non-eroding" liner is employed. Thus configured, the present invention provides a low-cost nozzle that is suitable for use in tactical rockets and other long-burn-duration applications.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A nozzle comprising an erosion distribution means for longitudinally distributing the effects of erosion caused by rocket motor combustion products, said erosion distribution means comprising an erosion region defining an erosion passage, the area of substantially all transverse sections of said erosion region being substantially constant, and said erosion passage having a length that is greater than the average diameter of said sections.

2. The nozzle of claim 1, wherein said erosion passage has a length at least about five times said average diameter of said sections.

3. The nozzle of claim 1, wherein said erosion passage has a length at least about seven times said average diameter of said sections.

4. The nozzle of claim 1, wherein said erosion passage has a length at least about ten times said average diameter of said sections.

5. The nozzle of claim 1, wherein said erosion region comprises a fibrous material embedded in a binder, and a substantial proportion of the fibers in said fibrous material are oriented transverse to the longitudinal axis of said erosion region.

6. The nozzle of claim 1, wherein said erosion region comprises a fibrous composite material selected from the group consisting of carbon-phenolic, graphite-phenolic, monolithic graphite, and silicon carbide ceramic for reducing the erosion of the erosion region caused by the combustion products when the rocket motor combustion products are produced by an aluminized propellant.

7. The nozzle of claim 1, wherein said erosion region comprises a fibrous composite material selected from the group consisting of glass-phenolic and silica-phenolic for reducing the erosion of the erosion region caused by the combustion products when the rocket motor combustion products are produced by a reduced smoke propellant that is substantially free of aluminum.

8. The nozzle of claim 1, wherein said erosion region comprises a fibrous composite material selected from the group consisting of cellulose-phenolic, glass-phenolic, and silica-phenolic for reducing the erosion of the erosion region caused by the combustion products when the rocket motor combustion products are produced by a minimum smoke propellant.

9. A nozzle configured for attachment to a rocket motor, the rocket motor having a combustion chamber capable of receiving combustion products from a propellant, said nozzle comprising a nozzle core having an inner surface defining a nozzle passage, said inner surface comprising:

an entry region defining an entry for receiving combustion products from the rocket motor combustion chamber during flight;

an exit region defining an exit for releasing combustion products into the ambient environment during flight;

an erosion region defining an erosion passage extending generally along a longitudinal axis for an erosion region length between said entry and said exit, each cross-section of said erosion region transverse to said longitudinal axis defining an erosion passage section having a section diameter and a section area; and at least one erosion focus region defining an erosion focus, said erosion region length being greater than said section diameter for substantially all sections within said erosion passage, such that the erosive forces caused by combustion products passing through said erosion passage during flight tend to focus on different portions of said erosion region over time.

10. The nozzle of claim 9, wherein said erosion region length is at least five times said section diameter for substantially all of said erosion passage sections.

11. The nozzle of claim 9, wherein said erosion region length is at least seven times said section diameter for substantially all of said erosion passage sections.

12. The nozzle of claim 9, wherein said erosion region length is at least ten times said section diameter for substantially all of said erosion passage sections.

13. The nozzle of claim 9, wherein the respective perimeter shapes of any pair of said erosion passage sections are substantially the same for substantially all pairs of said erosion passage sections.

14. The nozzle of claim 9, wherein said areas of said erosion passage sections vary no more than about five percent from one another for substantially all pairs of said erosion passage sections.

15. The nozzle of claim 9, wherein said areas of said erosion passage sections vary no more than about two percent from one another for substantially all pairs of said erosion passage sections.

16. The nozzle of claim 9, wherein said erosion region comprises a fibrous composite material and said fibrous composite material comprises a fibrous material embedded in a binder.

17. The nozzle of claim 16, wherein a substantial proportion of the fibers in said fibrous material are oriented transverse to said longitudinal axis of said erosion region.

18. The nozzle of claim 16, wherein a substantial proportion of the fibers in said fibrous material are oriented substantially perpendicular to said longitudinal axis of said erosion region.

19. The nozzle of claim 9, wherein said nozzle core comprises a fibrous composite material selected from the group consisting of carbon-phenolic, graphite-phenolic, monolithic graphite, and silicon carbide ceramic for reducing the erosion of the erosion region caused by the combustion products when the propellant is an aluminized propellant.

20. The nozzle of claim 9, wherein said nozzle core comprises a fibrous composite material selected from the group consisting of glass-phenolic and silica-phenolic for reducing the erosion of the erosion region caused by the combustion products when the propellant is a reduced smoke propellant that is substantially free of aluminum.

21. The nozzle of claim 9, wherein said nozzle core comprises a fibrous composite material selected from the group consisting of cellulose-phenolic, glass-phenolic, and silica-phenolic for reducing the erosion of the erosion region caused by the combustion products when the propellant is a minimum smoke propellant.

22. A nozzle configured for attachment to a rocket motor, the rocket motor having a combustion chamber capable of receiving combustion products from a propellant, the combustion chamber being disposed within a rocket motor housing, said nozzle comprising:

a substantially cylindrical hollow nozzle housing configured for attachment to the rocket motor housing; and a nozzle core having an outer surface and an inner surface, said outer surface being disposed adjacent said nozzle housing, said inner surface defining a nozzle passage, said inner surface comprising:

an entry region defining an entry for receiving combustion products from the rocket motor combustion chamber during flight;

an exit region defining an exit for releasing combustion products into the ambient environment during flight;

an erosion region defining an erosion passage extending generally along a longitudinal axis for a distance denoted the erosion region length, said erosion passage placing said entry in fluid communication with said exit during flight, each cross-section of said erosion region transverse to said longitudinal axis defining an erosion passage section having a section diameter, said areas of said erosion passage sections varying no more than about five percent from one another for substantially all pairs of said erosion passage sections; and at least one erosion focus region defining an erosion focus, a section of said erosion region defining said erosion focus region only when said section has an area that is no greater than the area of any other section of said erosion region;

wherein said erosion region length is at least five times said section diameter for substantially all erosion passage sections within said erosion passage, such that the erosive forces caused by combustion products passing through said erosion passage during flight tend to focus on different portions of said erosion region over time whereby the location of said portion of said erosion region which is serving as said erosion focus region tends to move within said erosion region over time, said nozzle core comprising a fibrous composite material selected from the group consisting of carbon-phenolic, graphite-phenolic, monolithic graphite, silicon carbide ceramic, cellulose-phenolic, glass-phenolic, and silica-phenolic for reducing the erosion of the erosion region caused by the combustion products.

23. The nozzle of claim 22, wherein said nozzle housing comprises metal.

24. The nozzle of claim 23, wherein said nozzle housing comprises aluminum.

25. The nozzle of claim 22, wherein said erosion region length is at least seven times said section diameter for substantially all of said erosion passage sections.

26. The nozzle of claim 22, wherein said erosion region length is at least ten times said section diameter for substantially all of said erosion passage sections.

27. The nozzle of claim 22, wherein said erosion region comprises a tube having a substantially circular cross-section.

28. The nozzle of claim 22, wherein a majority of the fibers in said fibrous composite material are oriented transverse to said longitudinal axis of said erosion region.

29. The nozzle of claim 22, wherein a majority of the fibers in said fibrous composite material are oriented substantially perpendicular to said longitudinal axis of said erosion region.

30. The nozzle of claim 22, wherein said nozzle core comprises carbon-phenolic for reducing erosion of the erosion region caused by the combustion products when the propellant is an aluminized propellant.

31. The nozzle of claim 22, wherein said nozzle core comprises glass-phenolic for reducing erosion of the erosion region caused by the combustion products when the propellant is a reduced smoke propellant that is substantially free of aluminum.

32. The nozzle of claim 22, wherein said nozzle core comprises cellulose-phenolic for reducing erosion of the erosion region caused by the combustion products when the propellant is a minimum smoke propellant.

* * * * *